United States Patent [19]
Tarry

[11] Patent Number: 5,137,665
[45] Date of Patent: Aug. 11, 1992

[54] PROCESS FOR DENSIFICATION OF TITANIUM DIBORIDE

[75] Inventor: Christopher A. Tarry, Sayre, Pa.

[73] Assignee: GTE Products Corporation, Stamford, Conn.

[21] Appl. No.: 599,527

[22] Filed: Oct. 18, 1990

[51] Int. Cl.⁵ .............................................. C04B 35/58
[52] U.S. Cl. ...................................... 264/62; 264/63; 264/65; 264/66
[58] Field of Search ....................... 264/65, 62, 63, 66; 501/96

[56] References Cited

U.S. PATENT DOCUMENTS

| | | | |
|---|---|---|---|
| 3,562,371 | 2/1971 | Bush | 264/332 |
| 3,853,973 | 12/1974 | Härdtl et al. | 264/570 |
| 4,007,251 | 2/1977 | Isaksson et al. | 501/96 |
| 4,246,027 | 1/1981 | Watanabe | 501/96 |
| 4,259,119 | 3/1981 | Watanabe | 501/96 |
| 4,292,081 | 9/1981 | Watanabe | 501/96 |
| 4,929,065 | 10/1981 | Ishii | 264/325 |

Primary Examiner—James Derrington
Attorney, Agent, or Firm—James Theodosopoulos

[57] ABSTRACT

In a process for producing a high density article of titanium diboride, a titanium diboride powder mixture is formed into a compact shape, and then sintered according to a two step sintering process with one step being at a low furnace pressure to close the surface porosity of the compact and the second sintering step being at a higher over pressure to form a high density article.

18 Claims, 1 Drawing Sheet

PROCESS FOR DENSIFICATION OF TITANIUM DIBORIDE

The present invention relates to a process for producing titanium diboride bodies of high density.

Densification of titanium diboride parts having large cross sections typically requires pressure assisted densification by hot pressing or hot isostatic pressing with additions to the titanium diboride starting powder to inhibit grain growth. Such additions may be other transition metal borides. Hot pressing has the disadvantage of being limited to simple shapes while hot isostatic pressing requires encapsulation of the part for densification and subsequent removal of the capsule material. Both pressure assisted densification methods are expensive and require expensive equipment for their operation.

Additives for titanium diboride which promote densification are known in the art. Examples are NiP alloys, NiB, $Ni_4B_3$, $Ni_3B$, FeB, $Fe_2B$, CoB, $CoB_2$, $Co_3B$ which are described in U.S. Pat. Nos. 4,292,081; 4,259,119; and 4,246,027. Ni is another example and is described as an additive in U.S. Pat. No. 4,812,208.

Recently the use of sintering aids has allowed some success in atmospheric pressure sintering of titanium diboride powders. Although such atmospheric pressure sintering is preferable to pressure assisted densification from a cost consideration, atmospheric pressure sintering typically requires higher temperatures and longer times to be effective. Such higher temperatures can result in excessive grain growth and inferior mechanical properties. Typically, it is difficult to achieve high densities with atmospheric pressure sintering, particularly for parts having large cross-sections.

SUMMARY OF THE INVENTION

It is an object of the present invention to achieve the economical benefits of the pressureless sintering techniques together with the benefits of the pressure assisted densification of short sintering times and less grain growth.

In accordance with the present invention, there is provided a process for producing a high density article of titanium diboride by providing a powder mixture comprising titanium diboride and a suitable densification aid, forming said powder into a compact shape, sintering said compact at a temperature from about 1800 degrees Centigrade to 2100 degrees Centigrade in an inert gas atmosphere at a low pressure of from about vacuum to about 0.3 MPa (30 psig) pressure for a sufficient period of time to close the surface porosity of said compact, increasing the pressure to about 1 to 10 MPa (130 to 1460 psig) pressure and further sintering said compact having closed surface porosity for a sufficient period of time to form a high density article of titanium diboride.

BRIEF DESCRIPTION OF THE DRAWING

The only FIGURE is a diagram of a sintering cycle of the present invention.

DETAILED DESCRIPTION

Figure 1:
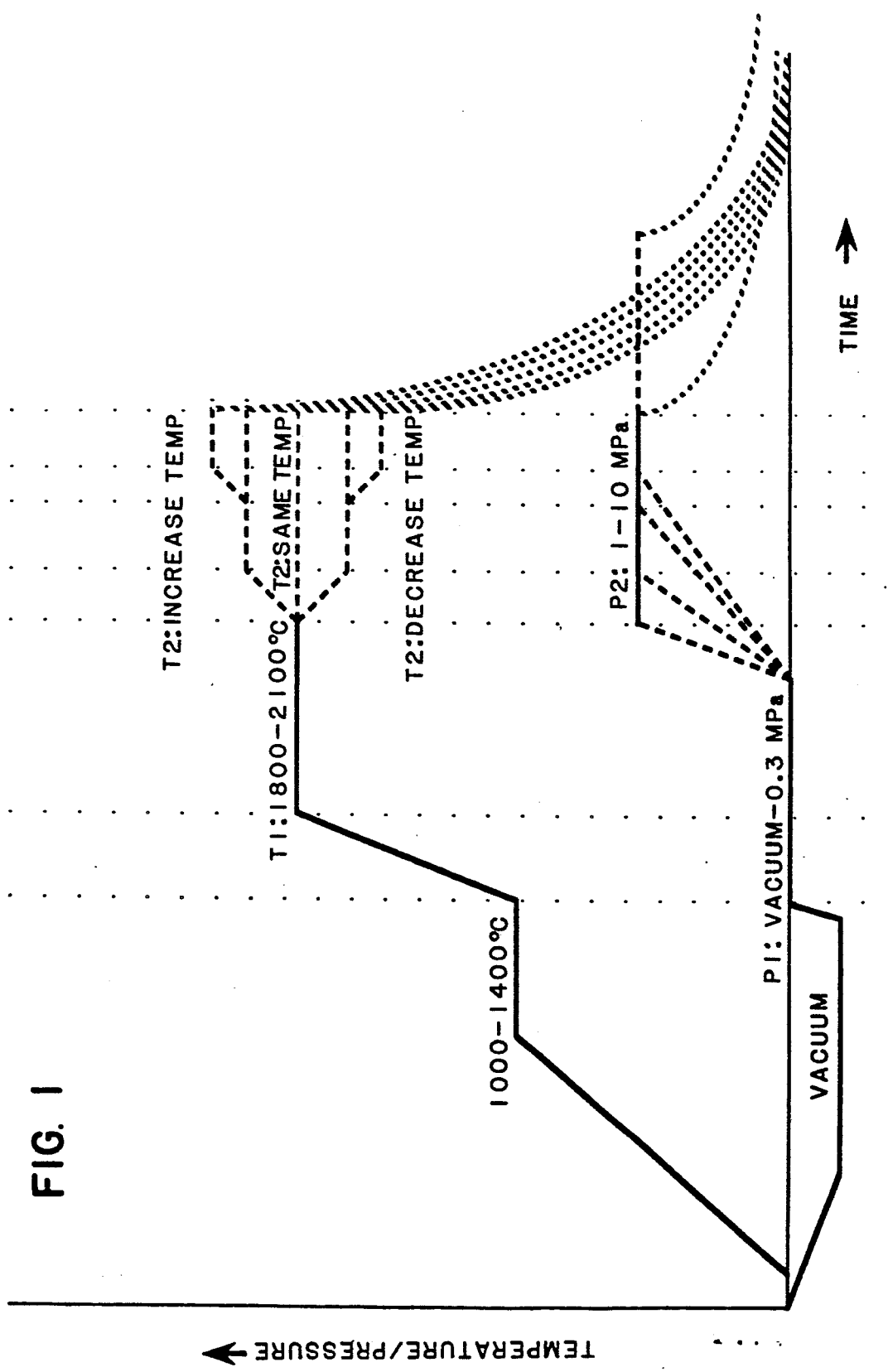

The present invention uses starting powders or blends of titanium diboride which are densifiable to a hard dense material. Such powders typically consist of at least about 80 percent by weight of titanium diboride. Typically blends of titanium diboride starting powders include sintering aids and grain growth inhibitors. Sintering aids are typically used in amounts from about 2 to about about 10 percent by weight and are present preferably in amounts less than about 5 percent by weight. Possible sintering aids are Fe, Co, Ni metals and compounds as hereinbefore referred to. Grain growth inhibitors which are typically used in amounts less than about 10 percent by weight are preferably used in amounts less than about 5 percent by weight. Although small amounts of grain growth inhibitors are difficult to detect by X-ray diffraction, it is believed they exist as secondary crystalline phases in the final dense product. Typical grain growth inhibitors include other transition metal borides. Additional unintentional additives which may be in the form of impurities are preferably present in amounts less than about 2 percent by weight.

The final sintered article preferably consists essentially of at least about 80 percent by weight titanium diboride and from about 2 to about 20 percent by weight of densification aids and grain growth inhibitors. The densification aids tend to form the intergranular phase. The preferred sintered product has a density ranging from about 96 percent to about 100 percent of the theoretical density of the titanium diboride mixture and preferably greater than about 98 percent of the theoretical density.

The present invention is particularly suited for densifying parts having a relatively large cross-section. With such parts, it is difficult to achieve full densities with pressureless sintering techniques. For purposes of the present description, relatively large parts are considered to have a description of at least about one-half of an inch and even more preferably of at least about three-quarters of an inch.

The titanium diboride starting powder may be conveniently prepared by mixing or milling the desirable constituents to form a homogeneous powder or may comprise commercially available titanium diboride powder. If the starting powder is formed from its constituents, it is generally desirable to mill the powders to form a homogeneous powder of fine particle size. Preferably the powder mean particle size should be less than 5 microns, most preferably less than 2 microns. The starting powder is next formed into a compact having a desired shape by techniques known in the art. According to one technique, the powder may be cold isostaticly pressed at sufficient pressure to form a compact which retains its shape for handling during subsequent operations. Typically pressures on the order of 207 to 310 MPa (30 to 45 kpsig) are desirable. According to other techniques known in the art, the titanium diboride starting powder may be mixed with a suitable organic binder to impart strength, typically called "green strength". Such binders may promote the flowability of the powder into die cavities and aid in pressing by lubricating. The cold isostatic pressing technique of forming a compact without use of binders is desirable for parts having a relatively thick cross-section, since it is not necessary to preheat the part for an extended period of time to remove the organic binder prior to sintering. It is contemplated that the compact may be formed by a variety of techniques including die pressing, cold isostatic pressing, extrusion, injection molding, or slip casting.

It is preferable for the compacted part to be coated or embedded in a powder mixture to reduce the tendency of the part to decompose and enhance the densification at sintering temperatures. Effective coating or bedding powders consist essentially of carbides, nitrides and borides of refractory metals and mixtures thereof. Preferably these powders have a fine grain size, most preferably their mean particle size is less than 5 microns. Preferably the embedding powders do not themselves sinter during the process of the present invention. Mixtures of these powders with boron nitride are effective at preventing sintering. Boron nitride mixed with titanium carbide is a preferred bedding powder. The compacts are typically arranged in trays or crucibles and coated with or embedded in the desired powder prior to loading in the sintering furnace.

In carrying out the process of the present invention, it is desirable to first heat the compact in a vacuum at a suitable temperature of about 1000 to about 1400 degrees Centigrade for a sufficient period of time to remove volatile materials contained in the compact. Temperatures employed are below the sintering temperature but sufficiently high to volatilize and drive gases from the interior of the compact. Times and temperatures for such an outgasing process will vary depending on the materials present in the compact and the size and thickness of the compact. Compacts having larger cross-sections will require more time to outgas than compacts having smaller cross sections. When the compact consist of isostatically compacted powder without additions of organic binders or compacts from which binders have already been removed in a separate step, the vacuum heating step comprises outgasing the compact during a relatively short heating cycle. In this case, typical temperatures are from 1000 to 1400 degrees Centigrade for time periods of from 1 to about 2 hours.

In accordance with the principles of the present invention, the compacts are subjected to a first sintering step at a temperature from about 1800 to 2100 degrees Centigrade in an atmosphere of an inert gas at a low pressure of from a vacuum to about 0.3 MPa (30 psig) for a sufficient period of time to close the surface porosity of the compact followed by a second sintering step at a higher pressure. The sintering steps follow the vacuum outgasing step. During sintering, an inert gas at a pressure is metered into the furnace chamber while the temperature of the furnace is increased to the desirable first sintering temperature. Typical inert gases suitable for the present process include helium, hydrogen, carbon monoxide, carbon dioxide, argon and mixtures thereof. For the present invention, nitrogen is not considered an inert gas since nitrogen can cause nitridation of the titanium diboride to titanium nitride. Once the compact reaches the desirable sintering temperature, relatively short times, typically less than four hours and preferably from about 1 to about 2 hours may be utilized to close the porosity of the surface. Since densification is most rapid at the surface of the part and proceeds inwards with time, it is necessary to soak the compact only for a sufficient period of time to close the porosity at the surface.

Generally, when the compact reaches the stage of surface closed porosity, the surface of the compact is impregnable to the inert gas in the furnace. This stage depends on the particular composition and sintering conditions. The point of surface closed porosity may be determined by interrupting the sintering cycle and determining the percent porosity of the resulting sintered material. Such determination may be made by weighing the compact prior to immersing the compact in boiling water or other suitable liquid or prior to vacuum impregnation with a suitable liquid. Next, the compact is weighed and the weight is compared to the starting weight to determine whether a weight gain has occurred. If no weight gain is observed, the compact will have obtained closed porosity over its outer surface.

During the second sintering step, the compact is sintered at the higher over pressure at a sufficiently high temperature for a sufficient period of time to achieve the desired high density. Typically the gas pressure is increased as fast as practicable while a variety of temperature soaks are possible to enhance density. The pressure employed during this second sintering step is typically from about 1 to 10 MPa (130 to 1460 psig) and preferably from about 1.5-2.0 MPa (200 to 280 psig). The effect of this pressure is to increase the driving force for densification and force densification to proceed towards theoretical density and zero porosity. Typically the pressure employed in the second sintering step is at least about twice the pressure utilized during the first sintering step. When the pressure of the first step is near vacuum, the pressure used in the second sintering step may be increased by a factor greater than two. Sintering times typically utilized for the second step are from about 1 to about 10 hours. It is to be understood that any time necessary to achieve full density can be used. The heating temperature during the second sintering step is preferably within the range of the first sintering step of from about 1800 to 2100 degrees Centigrade. Within this temperature range, the second sintering temperature can be the same as the first sintering temperature, reduced, or increased to a value greater than the first sintering temperature to facilitate sintering and control grain size. The second temperature typically varies from the first sintering temperature by amounts less than 300 degrees Centigrade.

The only FIGURE is a schematic drawing illustrating the sintering steps in the process of the present invention. The vertical axis represents temperature or pressure while the horizontal axis represents time. The diagonal lines represent a ramping of pressure or temperature from one step to the next step. The horizontal lines represent the vacuum outgasing step and the first and second sintering steps. The interrupted lines between the first and second sintering step are representative of various ramping steps that may be employed. The curved interrupted lines at the end of the second sintering step are representative of the cooling cycle. P1 and P2 and T1 and T2 represent the respective pressures and temperatures of the first and second sintering steps.

EXAMPLE I

The starting powder utilized is a titanium diboride powder commercially available as HCT-S $TiB_2$ powder from Union Carbide Corporation at 11907 Madison Ave., Cleveland, Ohio 44107. This powder is a binderless product. The powder consists essentially of titanium diboride powder with a small amount of densification aid, a detectable amount of a cobalt compound, and a small amount of chromium carbide as a grain growth inhibitor. According to the manufacturer, the expected theoretical density is 4.55 gms cm$^{-3}$. Small lots of the powder without additions of organic binder are cold compacted in an isostatic press at a pressure of 310 MPa (45 kpsig) to form compacts in the form of bars approximately 1 inch by 1 inch by 2 inches. The powder is loaded into rubber bags prior to compacting. The final compact has sufficient strength for further handling. The compacts are placed inside a graphite crucible in a bedding powder. The crucible is loaded into a graphite resistance furnace and the sintering cycle is initiated according to the cycle as generally set forth in the drawing. The furnace is heated to a temperature 1000 degrees Centigrade under vacuum. After a 1 hour period of soaking, argon is metered into the furnace to create a pressure of 0.13 MPa (4 psig). The temperature is raised to 1950 degrees Centigrade. The furnace is maintained at this pressure and temperature for a period of four hours to close the surface porosity of the compacts. Next, the argon pressure is increased to 1.8 MPa (250 psig) over a period of two and one half hours while the temperature is maintained constant. The part then is sintered during the second sintering step at this higher pressure for a period of 2½ hours. Depending on the bedding compound, the % theoretical densities of the final sintered body varied from 98.5% for BN/TiC, 94.1% for BN/TiB2, 87.6% for BN/B4C, and 96.5% for BN. The run was repeated with the time of the first sintering step decreased to two hours and the second sintering step increased to 4½ hours. The resulting % theoretical densities were as follows depending on the bedding compound, 98.8% for BN/TiC, 90.6% for BN/TiB$_2$, 87.5% for BN/B$_4$C, and 93.3% for BN. Commercially available fine grain size powders were used for the bedding compounds, mixtures were made up using equal parts of the separate compounds by volume.

EXAMPLE 2

The starting powder utilized is a titanium diboride powder also commercially available as HCT-SB TiB$_2$ powder from Union Carbide Corporation, 11907 Madison Ave., Cleveland, Ohio 44107. This powder is essentially the same as HCT-S grade of Example 1, except that it contains an organic binder. This powder is isostatically pressed at 310 MPa (45 kpsig) to give large section size tiles approximately 140×140×60 mm thick (5.5"×5.5"×2.5"). Following burn out of the organic binder in a nitrogen atmosphere, these tiles are baked out under vacuum at 1400° C. for 2 hours, and then machined to give tiles which would yield dimensions of 127×127 mm (5×5") with thicknesses of 6.4, 12.5, and 18.9 mm (0.25, 0.5 and 0.75") when densified. The machined tiles are placed inside a graphite crucible in a BN/TiC bedding powder. The crucible is loaded into a graphite resistance furnace and the sintering cycle is initiated according to the cycle set forth in the drawing. The furnace is heated to a temperature of 1400° C. under vacuum. After a 1-hour period of soaking, argon is metered into the furnace to create a pressure of 0.13 MPa (4 psig). The temperature is raised to 1900° C., and the furnace is maintained at this temperature and pressure for a period of two hours to close the surface porosity of the tiles. Next, the argon pressure is increased to 2.0 MPa (280 psig) over a period of 2½ hours while the temperature is increased to 1950° C. over a period of ½ hour and held at this level for a further 2 hours. Next, the temperature is again increased over a period of ½ hour to 2000° C., then held constant at this level for a further five hours. The argon pressure is held constant at 2.0 MPa (280 psig) over this 5½ hour time period. The tiles are thus sintered for a total time of 10 hours. The percent theoretical densities of the final sintered bodies were 99.2% for the 0.25" thick tile, 99.0% for both the 0.5" and 0.75" thick tiles.

I claim:

1. A process for producing a high density article of titanium diboride comprising providing a powder mixture, said powder mixture comprising titanium diboride and suitable densification aids and grain growth inhibitors, forming said powder into a compact shape, sintering said compact in a furnace at a temperature from about 1800 degrees Centigrade to 2100 degrees Centigrade at a furnace pressure of from about vacuum to about 0.3 MPa (30 psig) in a sintering atmosphere of an inert gas for a sufficient period of time to close the surface porosity of said compact, increasing said furnace pressure to about 1 to 10 MPa (130 to 1460 psig) and further sintering said compact for a sufficient period of time to form a high density article titanium of diboride.

2. A process for producing a high density article of titanium diboride according to claim 1 wherein said powder mixture consists essentially of at least about 80 percent by weight of titanium diboride.

3. A process for producing a high density article of titanium diboride according to claim 2 wherein said powder mixture additionally consists essentially of from about 2 to about about 20 percent by weight of densification aids and grain growth inhibitors.

4. A process for producing a high density article of titanium diboride according to claim 1 wherein the final sintered article has a density ranging from about 96 percent to about 100 percent of the theoretical density.

5. A process for producing a high density article of titanium diboride according to claim 4 wherein the final sintered article has a density greater than about 98 percent of the theoretical density.

6. A process for producing a high density article of titanium diboride according to claim 4 wherein the final sintered article has at least one section whose smallest dimension is greater than about 10 mm.

7. A process for producing a high density article of titanium diboride according to claim 4 wherein the compact is coated or embedded in a powder mixture prior to sintering to reduce the decomposition and enhance the densification.

8. A process for producing a high density article of titanium diboride according to claim 7 wherein said bedding powders consist essentially of carbides, nitrides and borides of refractory metals and mixtures thereof.

9. A process for producing a high density article of titanium diboride according to claim 7 wherein said bedding powder comprises boron nitride.

10. A process for producing a high density article of titanium diboride according to claim 7 wherein said bedding powder comprises titanium carbide.

11. A process for producing a high density article of titanium diboride according to claim 7 wherein said bedding powder comprises a mixture of boron nitride and titanium carbide.

12. A process for producing a high density article of titanium diboride according to claim 7 wherein, prior to sintering, said compact is heated in a vacuum at a suitable temperature for a sufficient period of time to remove volatile materials contained in the compact.

13. A process for producing a high density article of titanium diboride according to claim 12 wherein said heating in a vacuum is at a temperature of from 1000 to 1400 degrees Centigrade.

14. A process for producing a high density article of titanium diboride according to claim 13 wherein said sintering atmosphere of an inert gas comprises helium, hydrogen, carbon monoxide, carbon dioxide, argon and mixtures thereof.

15. A process for producing a high density article of titanium diboride according to claim 13 wherein said compact is sintered for a period of time from one to four hours to close the porosity of the surface.

16. A process for producing a high density article of titanium diboride according to claim 15 wherein the first sintering step is followed by a second sintering step, during said second sintering step the compact is sintered at an over pressure of from about 1.5 to 2.0 MPa (200 to 280 psig.)

17. A process for producing a high density article of titanium diboride according to claim 1 wherein sintering times during said second sintering are from about .1 to about 10 hours.

18. A process for producing a high density article of titanium diboride according to claim 1 wherein the heating temperature during the second sintering step is from about 1800 to 2100 degrees Centigrade.

* * * * *